United States Patent [19]

Dwyer

[11] Patent Number: 5,108,199
[45] Date of Patent: Apr. 28, 1992

[54] MOTOR BEARING SYSTEM
[75] Inventor: Mark K. Dwyer, Kent, Ohio
[73] Assignee: Ametek-Lamb Electric, Kent, Ohio
[21] Appl. No.: 628,411
[22] Filed: Dec. 17, 1990
[51] Int. Cl.⁵ .............................................. F16C 17/12
[52] U.S. Cl. ................................... 384/136; 384/214; 384/412; 384/413
[58] Field of Search ............... 384/209, 210, 214, 402, 384/409, 410, 413, 411, 412, 136

[56] References Cited
U.S. PATENT DOCUMENTS 3,332,727 7/1967 Gandrud ............................ 384/214
4,634,298 1/1987 Crawford ........................... 384/209

Primary Examiner—Lenard A. Footland
Attorney, Agent, or Firm—Renner, Kenner, Greive, Bobak, Taylor & Weber

[57] ABSTRACT

A motor bearing system is provided in which a motor shaft is received by a bearing which is circumferentially engaged by a first lubricating felt washer. A second lubricating felt washer is received by a retaining cup opposite the first lubricating felt washer, with a motor bracket interposed therebetween. The second lubricating felt washer is forced into contacting engagement with the first such washer by means of pins extending from the retaining cup and passing through apertures within the end bracket. Accordingly, the effective lubricating reservoir is significantly increased and the integrity of the lubricating reservoir is maintained.

13 Claims, 1 Drawing Sheet

MOTOR BEARING SYSTEM

TECHNICAL FIELD

The invention herein resides in the art of dynamoelectric machines such as motors and generators. More particularly, the invention relates to bearing systems for such machines and specifically to the lubrication system for bearings in motors or generators.

BACKGROUND ART

Heretofore, it has been known that motors and generators typically include a shaft rotatably supported at one or more areas by a bearing or bearings. In turn, the shaft is connected to a drive mechanism in the case of a generator, or to a driven device in the case of a motor. In either event, lubrication is required between the shaft and the bearings to limit friction, increase efficiency, and prolong life.

It has previously been known to use a felt washer about a bearing to achieve the desired lubrication. The felt washer is typically soaked or saturated with a lubricating oil and the bearing is sealed at opposite ends to prevent or restrict oil loss or migration. However, the amount of lubrication which can be achieved by such known systems is limited to the effective reservoir receiving the felt washer and lubricating oil. Further, the efficiency of such lubricating systems is typically dependent upon the ability of the system to maximize the retention of the lubricating oil at the bearing and to prevent or restrict migration of the oil therefrom. Accordingly, it is most desirable to obtain a lubricating system for a shaft and bearing assembly which maximizes the effective lubricating oil reservoir, while restricting the migration of such oil, and doing so in a compact and restricted area.

DISCLOSURE OF INVENTION

In light of the foregoing, it is an aspect of the invention to provide a motor bearing assembly having a lubrication system greatly increasing the oil reservoir over previously known systems.

Another aspect of the invention is the provision of a motor bearing assembly having a lubrication system which minimizes migration of oil from the bearing.

Yet an additional aspect of the invention is the provision of a motor bearing assembly having an improved lubrication system which is reliable, durable, and easy to implement with state of the art apparatus and techniques.

The foregoing and other aspects of the invention which will become apparent as the detailed description proceeds are achieved by the improvement in a dynamoelectric device having a shaft passing through a bracket and rotatably received within a bearing, comprising: a first felt washer encompassing said shaft through a first side of the bracket; a second felt washer encompassing said shaft on a second side of the bracket; and means urging said second felt washer into contacting engagement with said first felt washer.

Other aspects of the invention are attained by a motor bearing assembly, comprising: a shaft passing through a bracket and received by a bearing; a first felt washer maintained by a retainer on a first side of the bracket and in lubricating communication with said bearing; and a second felt washer maintained by a cup on a second side of the bracket and in lubricating communication with said first felt washer.

DESCRIPTION OF DRAWING

For a complete understanding of the objects, techniques and structure of the invention reference should be made to the following detailed description and accompanying drawing wherein.

BEST MODE FOR CARRYING OUT THE INVENTION

Figure 1:
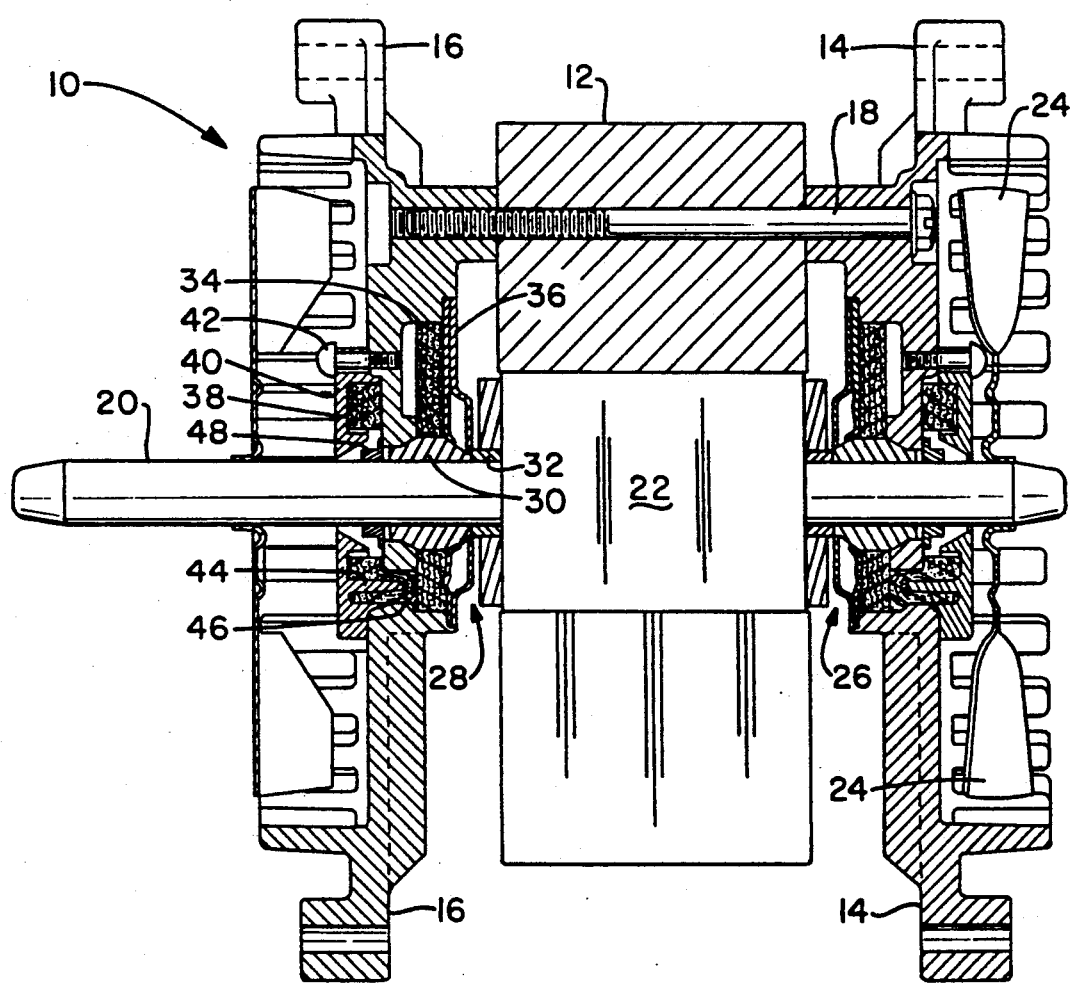
FIG. 1 is a partial sectional view of a motor assembly incorporating the novel lubrication system of the invention.
Figure 2:
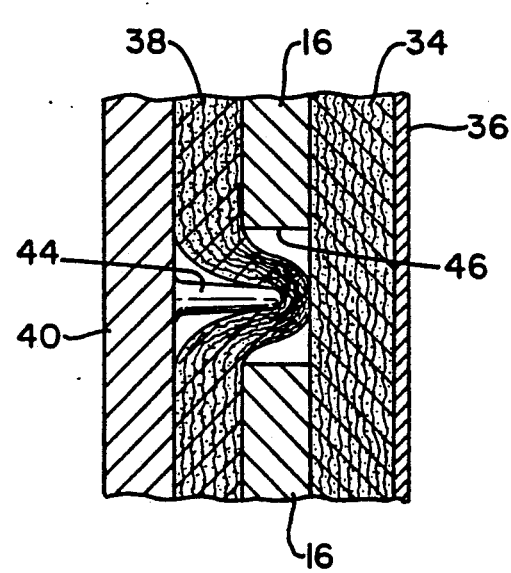
FIG. 2 is a sectional view of the lubrication system of FIG. 1 showing the two lubricating felts in communication with each other.

Referring now to the drawing, it can be seen that a motor assembly according to the invention is designated generally by the numeral 10. While it will be appreciated that the concept of the invention is applicable to any dynamoelectric device, the description herein will be respect to a motor assembly of the nature shown. In such a device, laminations or a stator 12 is interposed between a pair of motor end brackets 14, 16, such brackets being secured together by means of appropriate bolts 18.

Passing axially through the motor assembly 10 is a motor shaft 20. Appropriate apertures within the motor end brackets 14, 16 accommodate the passing of the shaft 20 which is coaxial with the stator 12. A rotor 22 is received upon the shaft 20 for rotation within the stator 12 in standard fashion.

A motor cooling fan 24 may be connected to one end of the shaft 20, while the other end may be connected to any suitable member to be driven by the motor 10. Typical devices for such driving arrangement would be fans, pumps, and the like.

Bearing assemblies 26, 28 are provided in association with the shaft 20 and on opposite sides of the rotor 22. The bearing assemblies 26, 28 are substantially identical to each other, and it will be appreciated that in some embodiments only a single such bearing system may be employed. In any event, since the bearing assemblies 26, 28 are substantially identical, only the assembly 28 will be described in detail below.

A bearing 30 is received upon the shaft 20 and spaced from the rotor 22 by means of an appropriate spacer 32 or the like. A felt washer 34 circumferentially encompasses the bearing 30 and is retained in fixed position with respect to the motor end bracket 16 and bearing 30 by means of a retainer 36. In a preferred embodiment of the invention the retainer 36 comprises a metal plate having an aperture engaging an end of the bearing 30 at the space 32 and in secured engagement against the bracket 16 and felt washer 34.

A second felt washer 38 has an annular ring through which the shaft 20 passes, and is received between an annular retaining cup 40 and the end bracket 16. The retaining cup 40 provides a cavity for receipt of the felt washer 38. The retaining cup 40 is secured to the end bracket 16 by means of rivets or drive screws 42 which pass through the cup 40 and into bracket 16. While any number of such rivets or drive screws may be employed, in a preferred embodiment of the invention four such holding means are provided. It will, or course, be appreciated that swaged bosses or other suitable securing means may be employed for the engagement of the retaining cup 40 with the end bracket 16.

As a novel feature of the instant invention, the retaining cup 40 is characterized by a plurality of pins or protrusions 44 extending therefrom. The pins 44 are in registration with apertures 46 passing through the motor end bracket 16, adjacent the felt washer 34. The pins 44 are of such a length as to pass substantially through the apertures 46 in such a manner as to urge the felt washer 38 into contacting engagement with the felt washer 34. Accordingly, the pair of felt washers, 34, 38 sandwiches the motor end bracket 16 and, when both are saturated with a lubricating oil, a substantial reservoir of lubricating oil is provided in direct communication with the bearing 30.

As shown, an oil slinger 48 is affixed to and rotatable with the shaft 20 to drive or pump oil which may otherwise escape from the bearing 30 either back to the bearing, or into the felt washer 38. In either event, the lubricating oil is retained within the lubricating system between the cup 40 and retainer 36.

It will be appreciated that a key to the instant invention is the increase in the effective lubricating reservoir by the implementation of two lubricating felt washers 34, 38, the first of which is in circumferential contacting engagement with the bearing 30, and the other of which is on the opposite side of the motor end bracket 16 and within a retaining cup 40. Intimate contacting engagement between the two felt washers 34, 38 is achieved by means of the plurality of pins 44, preferably four equally circumferentially spaced, which serves to drive the felt washer 38 into the felt washer 34. Of course, the aperture 46 is of sufficient diameter to accommodate such contacting engagement without choking off any transfer of lubrication oil between the two felt washers. A natural wicking action is the result. Any oil which should pass from the bearing 30 is engaged by the slinger 48 and either returned directly to the bearing 30, or to the felt washer 38 where it is transferred to the felt washer 34 and thence to the bearing 30.

As presented above, it should be appreciated that the bearing assembly 26 is substantially identical to the bearing assembly 28, just described. Accordingly, both ends of the shaft 30 are received by a bearing system with increased lubricating efficiency and capability.

Thus it can be seen that the objects of the invention have been satisfied by the structure presented above. While in accordance with the patent statues only the best mode and preferred embodiment of the invention has been presented and described in detail, it is to be understood that the invention is not limited thereto or thereby. Accordingly for an appreciation of the true scope and breadth of the invention reference should be made to the following claims.

What is claimed is:

1. In a dynamoelectric device having a shaft passing through a bracket and rotatably received within a bearing, the improvement comprising:
   a first felt washer encompassing said shaft on a first side of the bracket;
   a second felt washer encompassing said shaft on a second side of the bracket; and
   means urging said second felt washer into a contacting engagement with said first felt washer.

2. The improvement in a dynamoelectric device according to claim 1, wherein said second felt washer engages said first felt washer through an opening in the bracket.

3. The improvement in a dynamoelectric device according to claim 2, wherein said second felt washer is received within an annular cup secured to the bracket.

4. The improvement in a dynamoelectric device according to claim 3, wherein said cup has a projection urging said second felt washer into contacting engagement with said first felt washer.

5. The improvement in a dynamoelectric device according to claim 4, further comprising an oil slinger received on said shaft between said second side of the bracket and said annular cup.

6. The improvement in a dynamoelectric device according to claim 4, further comprising a retainer engaging the bracket on said first side thereof and securing said first felt washer in engagement with the bearing.

7. The improvement in a dynamoelectric device according to claim 6, wherein said first felt washer circumferentially contactingly engages the bearing.

8. A motor bearing assembly, comprising:
   a shaft passing through a bracket and received by a bearing;
   a first felt washer maintained by a retainer on a first side of the bracket and in lubricating communication with said bearing;
   a second felt washer maintained by a cup on a second side of the bracket and in lubricating communication with said first felt washer; and
   wherein said bracket has openings therein and said cup has pins extending therefrom in registration with said openings, said pins urging said second felt washer through said openings into engagement with said first felt washer.

9. The motor bearing assembly according to claim 8, wherein said cup is fixedly secured to said bracket.

10. A motor bearing assembly according to claim 9, wherein said shaft receives a lubrication slinger attached to sad shaft on said second side of said bracket and within said cup.

11. The motor bearing assembly according to claim 9, wherein said retainer and said cup define a lubrication reservoir encompassing said bearing.

12. The motor bearing assembly according to claim 11, wherein said first felt washer circumferentially contactingly engages said bearing.

13. The motor bearing assembly according to claim 12, wherein said first and second felt washers are saturated with lubricating oil.

* * * * *